(12) United States Patent
Gassho et al.

(10) Patent No.: US 7,672,278 B2
(45) Date of Patent: Mar. 2, 2010

(54) ADAPTOR FOR WIRELESS NETWORK

(75) Inventors: Kazuhito Gassho, Nagano-ken (JP); Susumu Shiohara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1704 days.

(21) Appl. No.: 10/304,007

(22) Filed: Nov. 26, 2002

(65) Prior Publication Data
US 2003/0100335 A1    May 29, 2003

(30) Foreign Application Priority Data
Nov. 27, 2001    (JP)    ............................. 2001-361274

(51) Int. Cl.
H04W 4/00    (2009.01)
H04L 12/28    (2006.01)
H04L 12/56    (2006.01)
H04H 60/09    (2008.01)
H04N 1/46    (2006.01)

(52) U.S. Cl. .................. 370/338; 370/395.53; 455/3.03; 455/3.04; 455/414.1; 455/432.1; 455/432.2; 455/432.3; 455/435.1; 455/435.2; 455/436; 455/439; 455/448; 358/508

(58) Field of Classification Search .................. 370/338, 370/395.53; 455/3.03–3.04, 414.1, 432.1–432.3, 455/435.1–435.2, 436, 439, 448; 358/508
See application file for complete search history.

(56) References Cited

U.S. PATENT DOCUMENTS

| 5,537,460 | A | * | 7/1996 | Holliday et al. ........... 455/435.1 |
|---|---|---|---|---|
| 5,740,160 | A | | 4/1998 | Ikegami et al. |
| 5,862,481 | A | * | 1/1999 | Kulkarni et al. .......... 455/432.2 |
| 5,901,362 | A | | 5/1999 | Cheung et al. |
| 6,714,799 | B1 | * | 3/2004 | Park et al. .................... 455/558 |
| 2001/0023446 | A1 | | 9/2001 | Balogh |
| 2001/0024953 | A1 | | 9/2001 | Balogh |
| 2002/0054345 | A1 | * | 5/2002 | Tomida et al. ............. 358/1.15 |
| 2002/0102987 | A1 | * | 8/2002 | Souisse et al. .............. 455/454 |

FOREIGN PATENT DOCUMENTS

| JP | 2000-224156 A | 11/2000 |
|---|---|---|
| JP | 2001-274816 A | 5/2001 |
| JP | 2003-101546 A | 4/2003 |
| WO | WO 01/89156 A2 | 11/2001 |

* cited by examiner

*Primary Examiner*—Patrick N Edouard
*Assistant Examiner*—Matthew W Genack
(74) *Attorney, Agent, or Firm*—Sughrue Mion, PLLC

(57) ABSTRACT

A printing device of the present invention has an additional function of switching over connection with two wireless networks. The printing device enters a user's wireless LAN based on first setting information, while establishing connection with a maker's wireless LAN based on second setting information to communicate with a printer, which is one of additional devices newly entering the user's wireless LAN. In response to a requirement from the printer, the printing device temporarily disconnects from the user's wireless LAN and enters the maker's wireless LAN to transmit setting information relating to the user's wireless LAN to the printer. This arrangement desirably relieves the labor of the user for settings in the additional devices to establish connection with the wireless network.

12 Claims, 8 Drawing Sheets

ADAPTOR FOR WIRELESS NETWORK

BACKGROUND OF THE INVENTION

1. Field of the Invention

The present invention relates to an adaptor used for connection with a wireless network

2. Description of the Related Art

Advancement in recent network technologies has actualized networks to which computers, printing devices, and a diversity of other devices are connected, for example, the Internet and various LANs (Local Area Networks). The network technologies actualize wireless communication by utilizing the functions of adaptors built in respective devices, as well as wired communication. The wireless communication eliminates the troubles in setting, connecting, and changing cables.

One method of attaining a wireless network is the infrastructure system utilizing a star-shaped network where terminals called stations (ST) are concentrically connected by a relay station called an access point (AP). In the infrastructure system, the access point that transmits a beacon continuously manages the group of stations to be connected, regardless of the actual data transmission. This ensures stable connection. The Ad Hoc system to attain direct wireless communication between devices is also used as a simple connection method. The drawback of the Ad Hoc system is relatively low connection stability.

Setting the information required for connection with the wireless network is rather complicated and labor-consuming. The complicated and labor-consuming work for settings is especially an important issue in the case of connection of many additional devices to the wireless network or in the case of connection of any devices without sufficient input interfaces for the settings, such as printing devices, to the wireless network.

The infrastructure system utilizes setting information called ESS-ID (Extended Service Set-ID) for prevention of interference. The ESS-ID is setting information essential for grouping communication objects in a wireless network. Setting a common ESS-ID in all devices involved in communication is required for construction of a network based on the infrastructure system. The process of setting the ESS-ID is rather complicated and labor-consuming in the use of the wireless network of the infrastructure system.

The above problem is not restricted to the process of setting the ESS-ID, but is commonly found in the process of setting any information required for connection with a wireless network.

SUMMARY OF THE INVENTION

The object of the present invention is thus to facilitate settings in an additional device for connection with a wireless network.

In order to attain at least part of the above and the other related objects, the present invention is directed to an adaptor for connection with a wireless network. The adaptor includes: a first storage module that stores first setting information used for connection with a first wireless network; a second storage module that stores second setting information used for connection with a second wireless network; and a communication establishment module that carries out switchover between the first setting information and the second setting information at preset timings to establish connection with either of the first wireless network and the second wireless network.

This arrangement ensures the flexible processing by selective use of the first wireless network and the second wireless network. For example, the technique of the present invention enables the adaptor to connect with both the first wireless network and the second wireless network without any difficulties and readily carry out the processing, which is implemented only under the condition of connection with both of the first wireless network and the second wireless network.

Even when one of the first and the second wireless networks is unusable due to any reason, this arrangement enables a desired object to be accomplished by utilizing the other available wireless network. One example of such case is that a desired connection target is capable of connecting with only one of the wireless networks. Another example is that the characteristics of one wireless network are unsuitable for a desired object. Still another example is that one of the wireless networks is out of order. Even when one of the wireless networks falls into any of these states, the arrangement of automatically selecting the other wireless network desirably ensures accomplishment of desired processing.

The communication establishment module may switchover the wireless network at only a single timing or in a repeated manner. One example of the former case is to switch over the wireless network in response to the user's instruction. One example of the latter case is to switch over the wireless network at predetermined time intervals. The switchover may completely disconnect from one wireless network or may just reduce the capacity of communication or the like.

A variety of structures may be adopted for the first storage module and the second storage module. For example, at least part of the first storage module and the second storage module may be an integral unit.

The setting information includes diverse pieces of information used for connection with a wireless network; for example, an ESS-ID, information regarding a radio signal, such as a frequency or a channel, information regarding a communication standard and encoding, information regarding the properties of wireless network, and information regarding hardware and software configurations that attain the wireless network. The setting information is not required to be proper to the wireless network, but may include an address, a domain name, a server name, and a work group on the network.

In accordance with one preferable application of the present invention, the adaptor further has a setting information transmission module that transmits setting information for connection with another wireless network except for the second wireless network to another device belonging to the second wireless network, in the course of connection with the second wireless network.

In the adaptor of this application, the setting information transmission module may transmit the first setting information.

The setting information transmission module facilitates settings in another device involved in the second wireless network. This arrangement ensures settings without any difficulties even in the case of connection of many additional devices to the wireless network or in the case of connection of any devices without sufficient input interfaces for the settings, such as printing devices, to the wireless network.

The setting information transmission module transmits the first setting information and causes the target device to enter the first wireless network. The setting information to be transmitted may be information set for connection with another wireless network. The adaptor may transmit two or more sets of setting information or may transmit any selected set of setting information in response to a requirement from another device or according to other conditions. The setting information to be transmitted by the adaptor of the invention may be acquired via any wireless network.

In the adaptor of the present invention, the communication establishment module may function as a relay station in the course of connection with the second wireless network.

In the adaptor of the present invention, the communication establishment module may utilize direct wireless communication in the course of connection with the second wireless network.

The direct wireless communication and the wireless communication by the functions as the relay station are selectively usable in the course of connection with the second wireless network. This arrangement desirably widens the application range of the adaptor of the present invention and enhances the convenience of the adaptor. The type of the wireless communication applicable for the second wireless network is selected according to the contents and the object of communication and the network connection ability of the device specified as a desired communication target.

In one preferable embodiment of the adaptor of the present invention, the second storage module stores plural sets of the second setting information, and the communication establishment module selects one set among the plural sets of the second setting information and establishes connection with the second wireless network.

This arrangement widens the application range of the function of connection with the second wireless network and enhances the convenience of the adaptor of the present invention. For example, this application allows selective use of the wireless network by the functions as the relay station and the wireless network utilizing direct wireless communication.

The adaptor of the present invention may be constructed to selectively use three or more wireless networks by switching over the second wireless network to be connected, based on the selected setting information.

In accordance with another preferable application of the present invention, the adaptor further has a detector module that determines presence or absence of any device functioning as a relay station in the second wireless network. The communication establishment module, in the case of the presence of the relay station, functions as a terminal relative to the relay station.

This arrangement effectively prevents interference with the functions of another relay station, and stably keeps the second wireless network. When there is no other device functioning as the relay station or when another relay station stops its functions, the adaptor itself exerts the functions as the relay station to establish connection with the second wireless network.

This arrangement enables the device functioning as the relay station to ensure stable processing with regard to not only the functions as the relay station but the other functions required for the device.

In the case of the presence of another nearby device functioning as a relay station, there is a possibility that the relay station transmits the setting information. In one application of the adaptor of the present invention, the setting information transmission module is not activated while the communication establishment module functions as the terminal.

This arrangement effectively prevents competition with another relay station in the course of transmission of the setting information.

In one preferable embodiment, the adaptor further has a fetching control module that fetches the setting information via the wireless network when the stored setting information is an initial value, and otherwise sends a transmission requirement to a device connected via the wireless network.

The adaptor of this embodiment automatically acquires the setting information according to the user's requirement. The adaptor of this arrangement has the enhanced capability of acquiring the setting information in response to a transmission requirement.

Connection with the wireless network may be established automatically based on the acquired setting information, in response to acquisition of the setting information. The process of transmitting the acquired setting information may also be carried out automatically, in response to acquisition of the setting information.

The adaptor of the present invention may be constructed as a network communication module for connecting a printing device with the wireless network.

For example, the adaptor may be a network communication unit integrated with the printing device or may be a print server separate from the printing device. The adaptor may otherwise be built in a computer that is connected with the printing device by cable and has the functions of a server. Another example of the adaptor is a substrate, card, or the like attachable to the printing device. The adaptor of the present invention is not restricted to these examples but may have any of other diverse structures.

The technique of the present invention is not restricted to the applications of the adaptor discussed above, but may be actualized by a diversity of other applications, for example, a method of connecting an adaptor with a wireless network. Other applications also include a computer program that attains the method of connecting the adaptor with the wireless network, a recording medium in which such a computer program is recorded, and a data signal that includes such a computer program and is embodied in a carrier wave.

Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

The above and other objects, features, aspects, and advantages of the present invention will become more apparent from the following detailed description of the preferred embodiments with the accompanying drawings.

DESCRIPTION OF THE PREFERRED EMBODIMENTS

Figure 1:
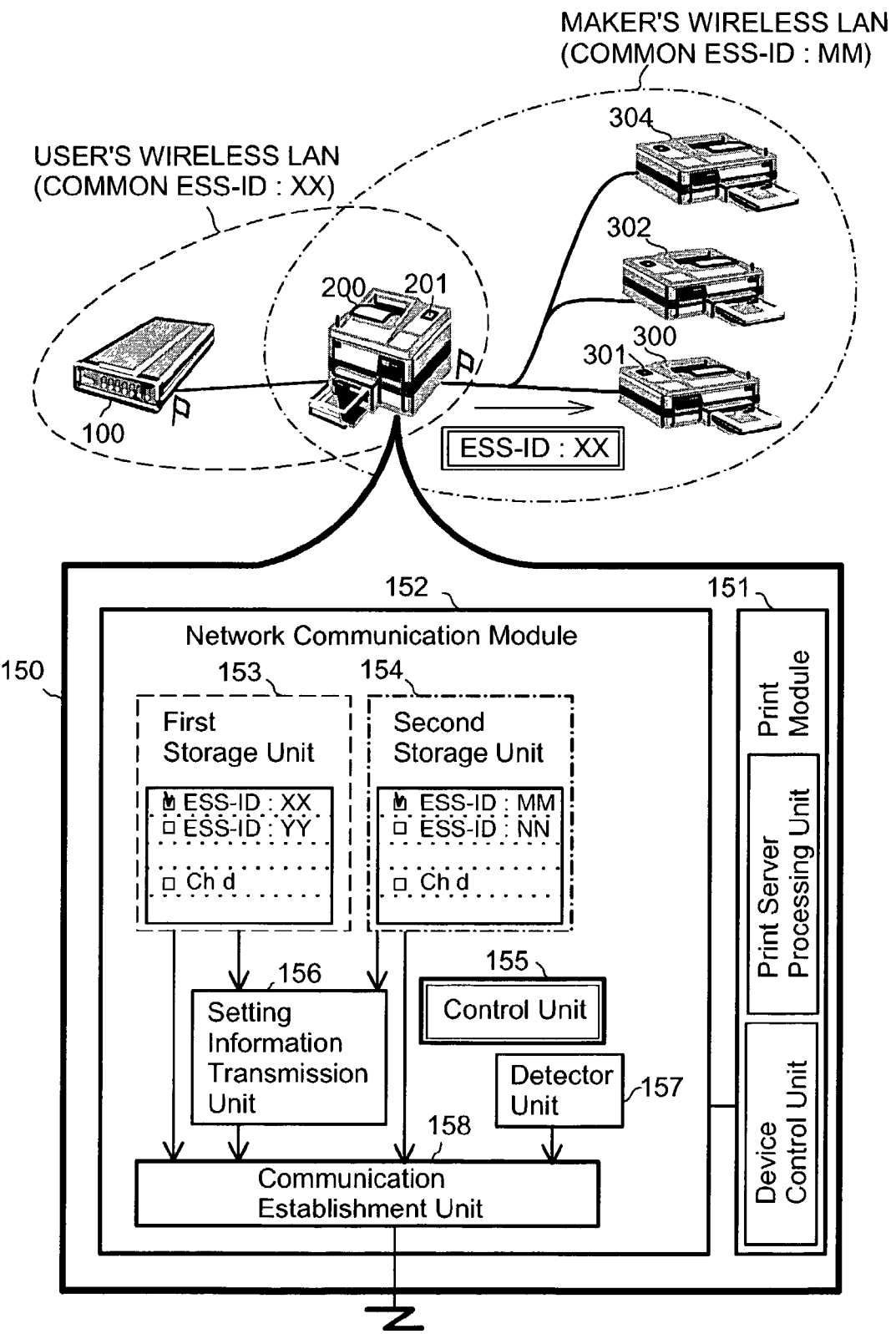
FIG. 1 schematically illustrates the configuration of a system in a first embodiment of the present invention.

Some modes of carrying out the present invention are discussed below as preferred embodiments in the following sequence:
A. Printing Device Transmitting ESS-ID:
B. Printing Device Utilizing Ad Hoc Communication in Combination:
C. Printing Device Acquiring ESS-ID:
D. Other Embodiments:

A. Printing Device Transmitting ESS-ID:

FIG. 1 schematically illustrates the configuration of a system in a first embodiment of the present invention. A printing device 200 in the system includes an adaptor used for connection with a wireless network. The adaptor functions to connect the printing device 200 with both a user's wireless LAN and a maker's wireless LAN. Printers 300 and 302, and 304 are additional devices to be newly connected to the user's wireless LAN. The printing device 200 transmits setting information used for connection with the user's wireless LAN to these additional devices by means of the maker's wireless LAN.

The user's wireless LAN is constructed as a wireless network based on the infrastructure system by the function of an access point 100 as a relay station. A value 'XX' is set as an initial value of ESS-ID in each of the devices belonging to the user's wireless LAN. Setting information ESS-ID 'XX' is required for connection with the user's wireless LAN. The access point 100 functioning as the relay station transmits a radio beacon to build the user's wireless LAN environment.

The maker's wireless LAN is also constructed as a wireless network based on the infrastructure system by the function of the printing device 200 as a relay station. A value 'MM' is set as a common ESS-ID in each of the devices belonging to the maker's wireless LAN. The printing device 200 functioning as the relay station transmits a radio beacon to build the maker's wireless LAN environment.

The printing device 200 is capable of switching over the connection between the user's wireless LAN and the maker's wireless LAN at preset timings and alternately connecting with either of the user's wireless LAN and the maker's wireless LAN. The printing device 200 communicates with devices belonging to the maker's wireless LAN during connection with the maker's wireless LAN, while communicating with devices belonging to the user's wireless LAN during connection with the user's wireless LAN.

The printing device 200 communicates with the additional printers 300, 302, and 304 via the maker's wireless LAN and transmits the setting information including the ESS-ID 'XX' to make these additional printers 300, 302, and 304 enter the user's wireless LAN.

Although only the three printers 300, 302, and 304 are shown as the additional printers in FIG. 1, the number of additional printers is not restricted to three.

The functional blocks of the printing device 200 are shown in FIG. 1. The printing device 200 has a control unit 150, which is constructed as a microcomputer including a CPU and memories. The respective functional blocks are attained by software as the functions of the control unit 150, although the functional blocks may alternatively be actualized by hardware.

The printing device 200 has a printing module 151 and a network communication module 152. The printing module 151 includes a print server processing unit and a device control unit and is in charge of series of processing directly related to printing. The network communication module 152 is in charge of series of processing related to wireless communication of the printing device 200 with external devices.

The network communication module 152 has a first storage unit 153, a second storage unit 154, a communication establishment unit 158, a setting information transmission unit 156, a detector unit 157, and a control unit 155.

Both the first storage unit 153 and the second storage unit 154 store setting information used for connection with wireless networks. The first storage unit 153 stores first setting information used for connection with the user's wireless LAN, while the second storage unit 154 stores second setting information used for connection with the maker's wireless LAN. The setting information stored in these storage units 153 and 154 include various pieces of information, such as a radio frequency utilized for communication, a channel number, a specified communication system, and information relating to an encoding process. In the case of infrastructure communication system, the setting information generally includes ESS-IDs. The first storage unit 153 and the second storage unit 154 may be an integral storage unit.

The communication establishment unit 158 functions to implement switchover between the first setting information and the second setting information at preset timings, in order to establish communication with the two wireless networks. The wireless network as the target of connection may adopt the infrastructure system or the Ad Hoc system. In the case of the infrastructure wireless network, the network communication module 152 may function as a terminal or as a relay station. In this embodiment, the network communication module 152 functions as a terminal for communication based on the contents in the first storage unit 153. In the case of communication based on the contents in the second storage unit 154, on the other hand, the network communication module 152 may function as a terminal or as a relay station according to the situations.

The setting information transmission unit 156 functions to transmit the first setting information stored in the first storage unit 153 via the maker's wireless LAN. This attains setting for connection with the user's wireless LAN in an external device connected via the maker's wireless LAN.

The detector unit 157 determines the presence or the absence of any device functioning as a relay station in the maker's wireless LAN. A diversity of methods may be applicable for the detection. For example, the detector unit 157 may detect the radio beacon output from the relay station.

The control unit 155 totally controls the respective functional blocks of the network communication module 152 to attain the respective series of processing.

Figure 2:
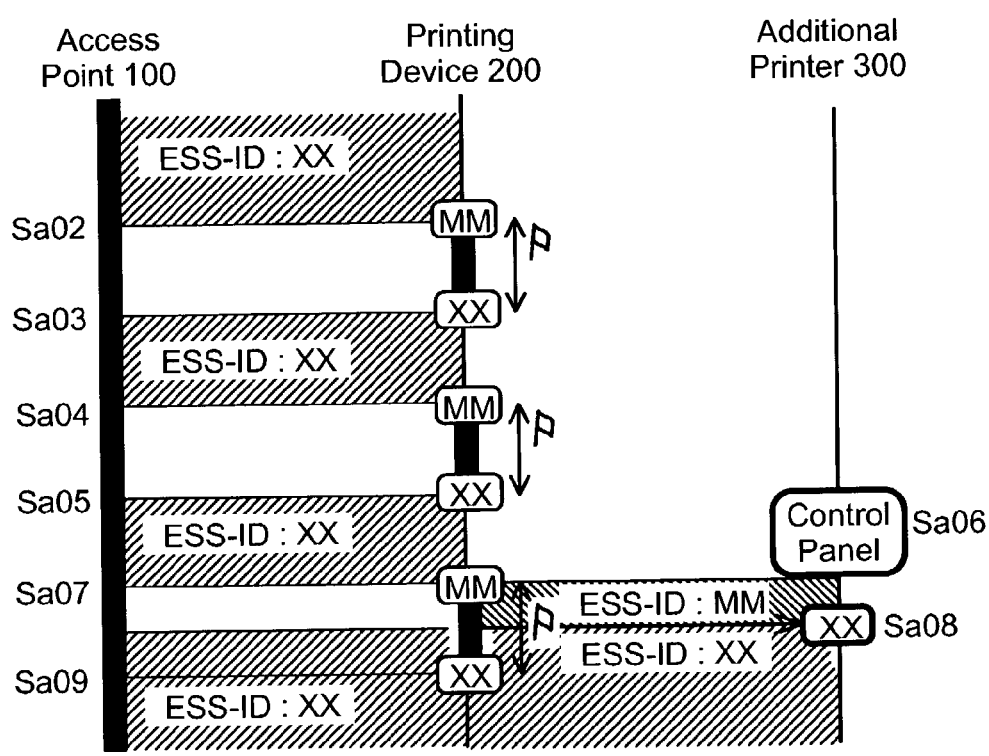
FIG. 2 is a timing chart showing the timings of a process of setting additional printers in the first embodiment.

FIG. 2 is a timing chart showing the timings of a process of setting additional printers in the first embodiment. In this example, one ESS-ID 'XX' and another ESS-ID 'MM' are stored in advance in the first storage unit 153 and in the second storage unit 154, respectively. The ESS-ID 'MM' is stored in the additional printer 300.

At a timing Sa02, the printing device 200 temporarily cuts connection with the user's wireless LAN, while establishing connection with the maker's wireless LAN. The communication establishment unit 158 carries out the process of switching over the target wireless network to be connected. This process starts in response to detection that connection with the user's wireless LAN has continued for a predetermined time period. The time period is set in advance by the user's input. For example, the time period may be set according to the priority of the processing relating to the user's wireless LAN as a parameter.

At a timing Sa03, the printing device 200 cuts the connection with the maker's wireless LAN established at the timing Sa02, and restores connection with the user's wireless LAN. Time spans with flags in FIG. 2 represent the time periods of connection with the maker's wireless LAN. The communication establishment unit 158 carries out the processing at the timing Sa03 when the connection with the maker's wireless LAN has exceeded a predetermined time period. The time period of connection with the maker's wireless LAN is also set in advance by the user's input.

The communication establishment unit 158 repeats the process of switching over the target wireless network to be connected at timings Sa04 through Sa09.

It is assumed that the user operates a control panel 301 of the additional printer 300 at a timing Sa06. The user operates the control panel 301 and causes the additional printer 300 to start a process of acquiring the ESS-ID. The additional printer 300 accordingly establishes communication as a terminal with the ESS-ID 'MM'.

At a timing Sa07, the printing device 200 functions as the relay station and connects with the maker's wireless LAN. This attains establishment of connection between the printing device 200 and the additional printer 300.

At a timing sa08, the printing device 200 actually transmits and sets the ESS-ID to and in the additional printer 300. The printing device 200 reads the ESS-ID 'XX' from the first storage unit 153 and activates the function of the setting information transmission unit 156 to transmit the ESS-ID 'XX' to the additional printer 300. The additional printer 300 receives the transmitted ESS-ID 'XX', disconnects from maker's wireless LAN, and enters the user's wireless LAN with the received ESS-ID 'XX'. The additional printer 300 then functions as the terminal and continuously communicates with the access point 100.

The printing device 200 that has transmitted the ESS-ID to the additional printer 300 and restored connection with the user's wireless LAN at the timing Sa09 continually establishes temporary connection with the maker's wireless LAN, like the time periods between the timings Sa02 and Sa03, between the timings Sa04 and Sa05, and between the timings Sa07 and Sa09. Such temporary connection enables settings in new additional printers.

Figure 3:
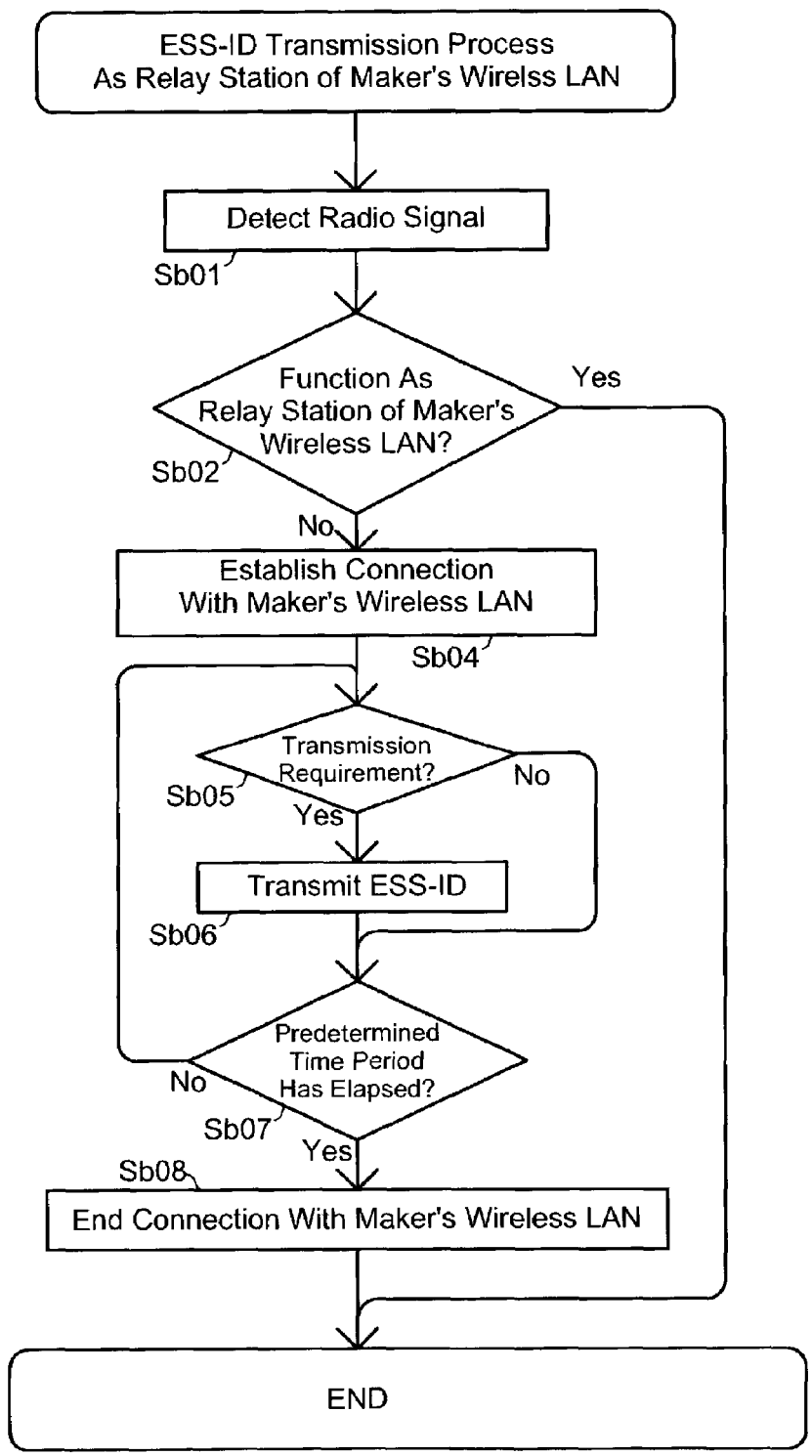
FIG. 3 is a flowchart showing an ESS-ID transmission and setting process executed in the first embodiment.

FIG. 3 is a flowchart showing an ESS-ID transmission and setting process executed in the first embodiment. The printing device 200 executes this ESS-ID transmission process at preset time intervals, in parallel to the communication process with the user's wireless LAN. This corresponds to the processing carried out in the time periods between the timings Sa02 and Sa03, between the timings Sa04 and Sa05, and between the timings Sa07 and Sa09 in the process shown in FIG. 2.

The printing device 200 detects a radio beacon of the maker's wireless LAN at step Sb01, and determines the presence or the absence of any external device functioning as a relay station in the maker's wireless LAN at step Sb02. The determination is carried out by the detector unit 157 (see FIG. 1). The description first regards the case of the absence of any external device functioning as a relay station in the maker's wireless LAN. In this case, the printing device 200 itself functions as the relay station in the maker's wireless LAN. The printing device 200 carries out the processing of steps Sb04 through Sb08 and transmits the ESS-ID to a device newly entering the user's wireless LAN by the own function as the relay station in the maker's wireless LAN.

At step Sb04, the printing device 200 establishes connection with the maker's wireless LAN, based on its function as the relay station. The printing device 200 reads the ESS-ID 'MM' from the second storage unit 154 and establishes connection with the maker's wireless LAN, while temporarily disconnecting from the user's wireless LAN.

At step Sb05, the printing device 200 specifies the presence or the absence of a transmission requirement of the ESS-ID from the external device via the maker's wireless LAN. In the case of the presence of the transmission requirement, the printing device 200 transmits the ESS-ID 'XX' for entering the user's wireless LAN at step Sb06. In the case of the absence of the transmission requirement, on the other hand, the program does not execute the processing of step Sb06 but proceeds to step Sb07.

It is determined at step Sb07 whether or not a predetermined time period has elapsed since the establishment of connection with the maker's wireless LAN at step Sb04. When the predetermined time period has not yet elapsed, the program returns to step Sb05 to specify the presence or the absence of the transmission requirement from the external device. When the predetermined time period has already elapsed since the establishment of connection with the maker's wireless LAN, on the other hand, the printing device 200 ends the connection with the maker's wireless LAN at step Sb08 and restores the connection with the user's wireless LAN.

In the case of the presence of any external device functioning as the relay station in the maker's wireless LAN at step Sb02, the printing device 200 itself does not function as the relay station in the maker's wireless LAN but immediately exits from this processing routine. This effectively prevents interference of the functions of the external device as the relay station and ensures the stability of the maker's wireless LAN.

A diversity of processes may be applicable for the switchover between the two wireless networks carried out by the printing device 200. In this embodiment, the printing device 200 automatically executes the switchover according to the elapse of the predetermined time period. The switchover may, however, be carried out in response to an individual switchover instruction utilizing the control panel 201 (see FIG. 1) or a wireless network.

The above embodiment regards the configuration of the network communication device built in the printing device 200. Another application of the present invention is a print server different from the printing device 200. The present invention is not restricted to radio devices relating to printing, but may be constructed as a diversity of devices used for connection with the wireless network.

The system of the embodiment facilitates settings for connection in additional devices to the wireless network. This arrangement ensures settings without any difficulties even in the case of connection of many additional devices to the wireless network or in the case of connection of any devices without sufficient input interfaces for the settings, such as printing devices, to the wireless network.

B. Printing Device Utilizing Ad Hoc Communication in Combination:

The following describes a second embodiment of the present invention, where the printing device transmits setting information by utilizing a direct wireless communication system in combination. In the first embodiment, communication of the infrastructure system is applied for the maker's wireless LAN. But the maker's wireless LAN is not restricted to this system. The advantages of the direct wireless communication system are convenience and simplicity in establishment of a network, although the direct wireless communication network has a disadvantage, the less stability of connection. A diversity of techniques may be applicable for the direct wireless communication system. In this embodiment, the Ad Hoc system is applied for direct wireless communication.

Figure 4:
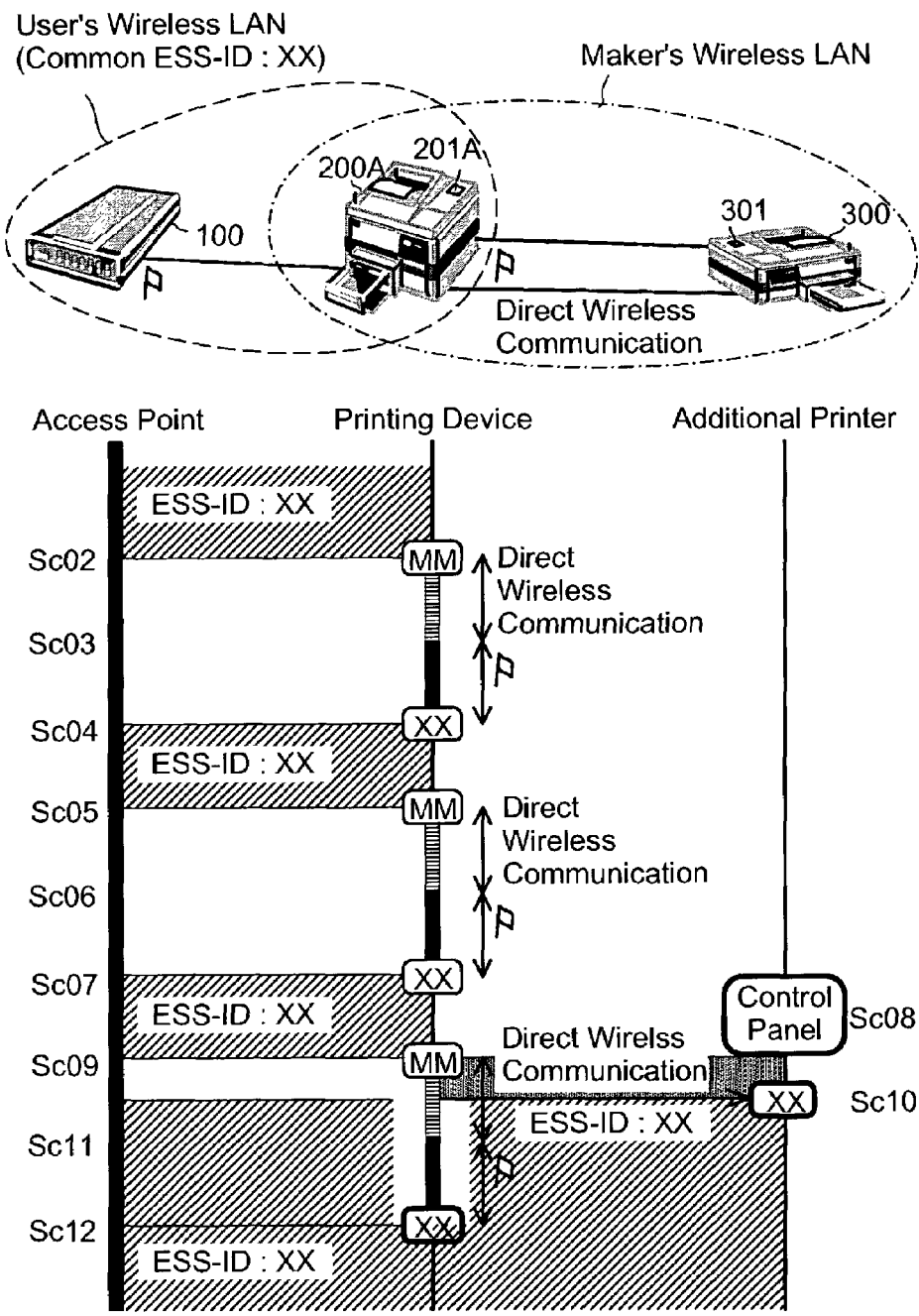
FIG. 4 is a timing chart showing the timings of a process of utilizing the Ad Hoc system in combination in a second embodiment of the present invention.

FIG. 4 is a timing chart showing the timings of a process of utilizing the Ad Hoc system in combination in the second embodiment. The system configuration of the second embodiment is identical with that of the first embodiment. The difference from the first embodiment is that a printing device 200A of the second embodiment transmits and sets an ESS-ID to and in an additional printer 300 via communication of the Ad Hoc system.

Like the first embodiment, the printing device 200A alternately establishes connection with the user's wireless LAN and with the maker's wireless LAN. The printing device 200A keeps connection with the maker's wireless LAN for time periods between timings Sc02 and Sc04, between timings Sc05 and Sc07, and between timings Sc09 and Sc12.

In the second embodiment, the maker's wireless LAN utilizes communication of the Ad Hoc system for time periods between timings Sc02 and Sc03, between timings Sc05 and Sc06, and timings Sc09 and Sc11, while utilizing communication of the infrastructure system for time periods between timings Sc03 and Sc04, between timings Sc06 and Sc07, and timings Sc11 and Sc12.

The printing device 200A disconnects from the user's wireless LAN and establishes communication of the Ad Hoc system at the timing Sc02. The printing device 200A concludes the Ad Hoc wireless communication and establishes communication as the relay station at the timing Sc03. This series of processing is executed for the other time periods utilizing the Ad Hoc communication system.

The user operates the control panel 301 of the additional printer 300 at the timing Sc08. The additional printer 300 establishes communication of the Ad Hoc system in response to the user's input through this operation. The additional printer 300 is then ready for receipt of the ESS-ID transmitted from the printing device 200A via the Ad Hoc communication.

The printing device 200A establishes a setting network based on the Ad Hoc wireless communication system to connect with the additional printer 300 at the timing Sc09. The printing device 200A actually transmits the ESS-ID used for entering the user's wireless LAN to the additional printer 300 at the timing Sc10. The additional printer 300 accordingly establishes connection with the user's wireless LAN, as in the case of the timing Sa08 of the first embodiment shown in the timing chart of FIG. 2.

Figure 5:
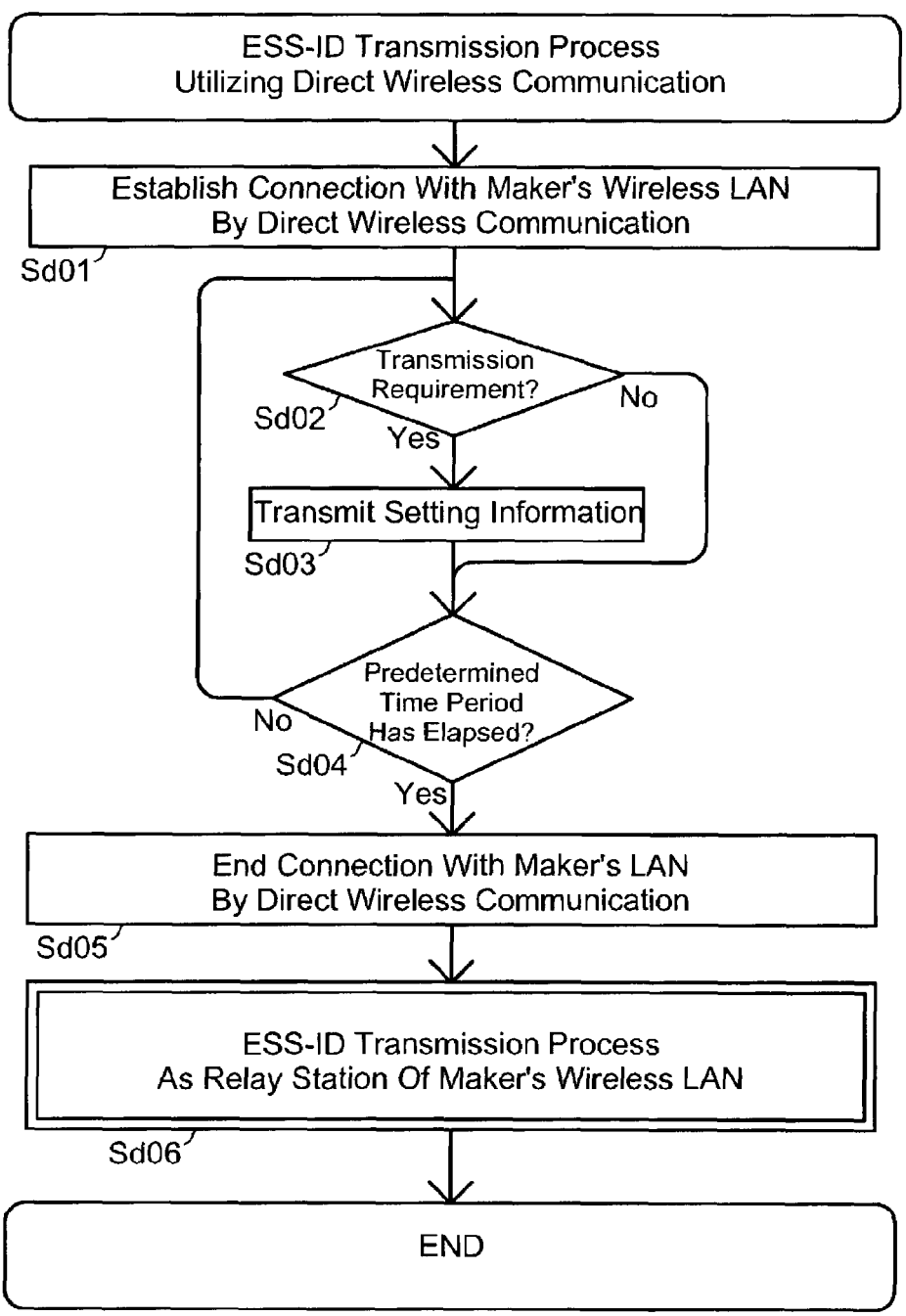
FIG. 5 is a flowchart showing an ESS-ID transmission and setting process executed in the second embodiment.

FIG. 5 is a flowchart showing an ESS-ID transmission and setting process executed in the second embodiment. This corresponds to the series of processing executed in the first embodiment and shown in the flowchart of FIG. 3.

The processing of steps Sd01 through Sd05 in the flowchart of FIG. 5 regards the maker's wireless LAN based on communication of the Ad Hoc system. At step Sd05, the printing device 200A concludes the communication of the Ad Hoc system with the maker's wireless LAN, but does not restore connection with the user's wireless LAN. This is because the printing device 200A establishes connection with the maker's wireless LAN based on the functions as the relay station at subsequent step Sd06.

The processing of step Sd06 in FIG. 5 follows the series of processing shown in the flowchart of FIG. 3. The printing device 200A establishes connection with the maker's wireless LAN by the functions as the relay station and transmits the ESS-ID in response to a transmission requirement from the additional printer 300. In the processing routine of FIG. 3, the connection with the user's wireless LAN is cut, prior to establishment of connection with the maker's wireless LAN. The processing of the second embodiment, however, does not require such disconnection, since connection with all the wireless networks has already been cancelled prior to execution of step Sd06.

The application utilizing the wireless communication of the Ad Hoc system is not restricted to the processing discussed in this embodiment. For example, only the communication of the Ad Hoc system may be utilized for the processing. Another modification allows the user to select a desired system between communication of the Ad Hoc system and communication of the infrastructure system.

The system of the embodiment facilitates setting of required information for connection with the wireless network in a diversity of devices. This arrangement widens the variety of target devices of settings, thus enhancing the convenience of the device used for transmission of the setting information.

C. Printing Device Acquiring ESS-ID:

The following describes a process of acquiring the ESS-ID as a third embodiment of the present invention. A printing device 200B of the third embodiment acquires the ESS-ID and enters the user's wireless LAN with the acquired ESS-ID.

Figure 6:
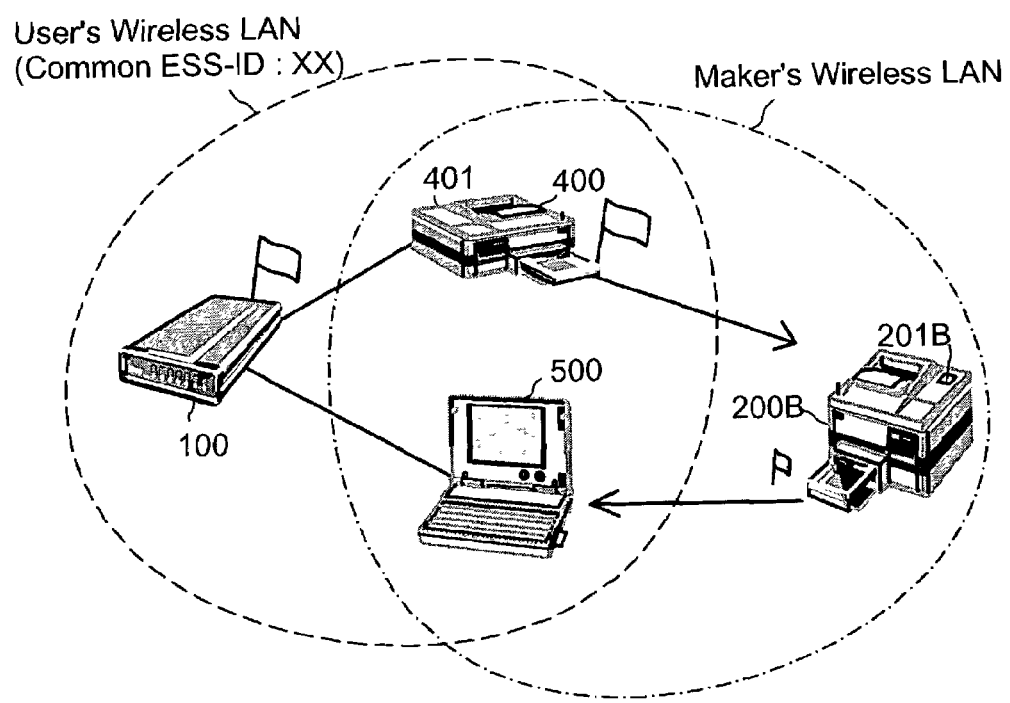
FIG. 6 schematically illustrates the configuration of a system in a third embodiment of the present invention.

FIG. 6 schematically illustrates the configuration of a system in the third embodiment. The printing device 200B is a device newly entering the user's wireless LAN. The user's wireless LAN is constructed by the functions of the access point 100 as the relay station. An existing printer 400 and a personal computer 500 are devices that currently belong to the user's wireless LAN. The printing device 200B acquires the ESS-ID for entering the user's wireless LAN from the existing printer 400 or the personal computer 500.

The printing device 200B starts an ESS-ID acquisition process in the case where the ESS-ID stored therein is an initial value. For example, the printing device 200B may utilize a flag representing a factory shipment state and start the ESS-ID acquisition process when the flag is set in the factory shipment state. In another example, the printing device 200B may start the ESS-ID acquisition process in response to the user's input through an operation of a control panel 201B (see FIG. 6) or via a wireless network.

The ESS-ID is acquired via the maker's wireless LAN. A variety of techniques may be applied for the maker's wireless LAN, as discussed in the precedent embodiments. This embodiment utilizes the maker's wireless LAN with different relay stations in combination. In one state, the existing printer 400 functions as the relay station, and the printing device 200B establishes communication with the existing printer 400. In the other state, the printing device 200B functions as the relay station and establishes communication with the personal computer 500. The existing printer 400 and the personal computer 500 are both capable of switching over the connection with the user's wireless LAN and the maker's wireless LAN.

When the existing printer 400 normally functions as the relay station in the maker's wireless LAN, the printing device 200B functions as the terminal to acquire the ESS-ID. When the existing printer 400 has any problem in exerting the functions as the relay station, on the other hand, the printing device 200B activates the own functions as the relay station to acquire the ESS-ID. In this case, the user may utilize the personal computer 500 as the terminal to set the ESS-ID in the printing device 200B.

A utility software program for transmitting and setting the ESS-ID is provided in the personal computer 500. The user utilizes this utility software program and inputs the ESS-ID 'MM', which has been stored in advance in the printing device 200B, into the personal computer 500. The user makes the personal computer 500 enter the maker's wireless LAN to set the ESS-ID in the printing device 200B.

The printing device 200B acquiring a common ESS-ID 'XX' of the user's wireless LAN enters the user's wireless LAN. The series of processing shown in the first embodiment or the series of processing shown in the second embodiment may start simultaneously with entry of the printing device 200B into the user's wireless LAN.

Figure 7:
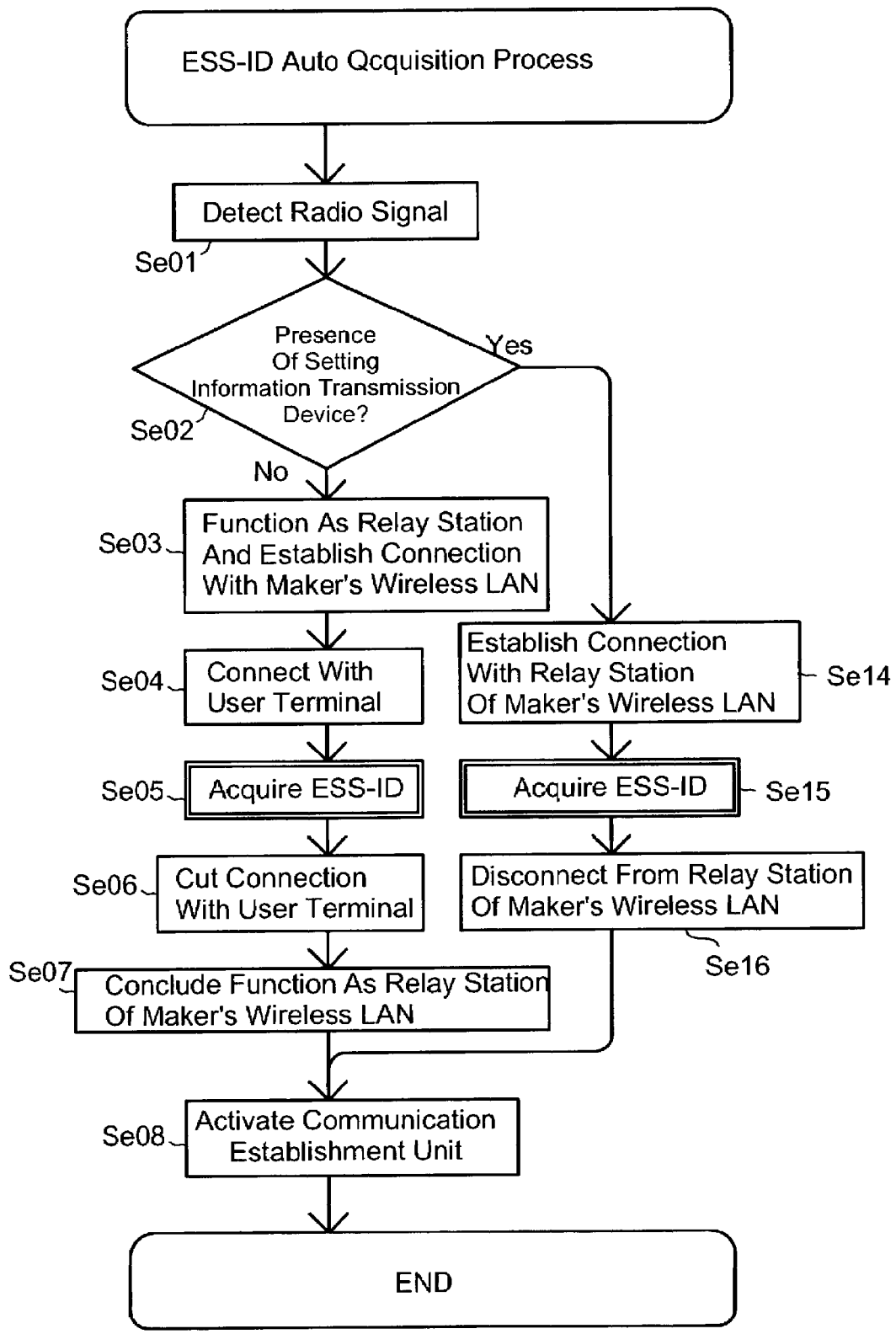
FIG. 7 is a flowchart showing an ESS-ID acquisition process executed in the third embodiment.

FIG. 7 is a flowchart showing an ESS-ID acquisition process executed in the third embodiment. The printing device 200B acquires the ESS-ID 'XX' and establishes connection with the user's wireless LAN through this series of processing.

The printing device 200B carries out the processing of steps Se01 and Se02, which are similar to the processing of steps Sb01 and Sb0 executed in the first embodiment and shown in the flowchart of FIG. 3. The printing device 200B detects a radio beacon at step Se01 and determines the presence or the absence of any external device that is capable of transmitting the ESS-ID to the printing device 200B via the maker's wireless LAN. In this embodiment, the existing printer 400 is an example of such external device.

The program proceeds to the processing of steps Se14, Se15, and Se16 in the case of the presence of the existing printer 400 determined at step Se02. The printing device 200B executes the processing of steps Se14, Se15, and Se16 in response to detection of a radio beacon from the existing printer 400. The printing device 200B establishes connection with the existing printer 400 at step Se14 and acquires the ESS-ID at step Se15. The printing device 200B stores the acquired common ESS-ID 'XX' of the user's wireless LAN into the first storage unit 153. The printing device 200B cuts the connection with the existing printer 400 and disconnects from the maker's wireless LAN at step Se16.

The program proceeds to the processing of steps Se03 through Se07 in the case of the absence of the existing printer 400 as the relay station determined at step Se02. In this case, the printing device 200B itself functions as the relay station to connect with the personal computer 500 and acquire the ESS-ID. At step Se03, the printing device 200B activates the functions as the relay station of the maker's wireless LAN. More specifically the printing device 200B reads a common ESS-ID 'MM' of the maker's wireless LAN, which has stored in advance in the second storage unit 154, and starts a preset series of processing, such as transmission of a radio beacon. At step Se04, the printing device 200B connects with the personal computer 500, which enters the maker's wireless LAN as the terminal. The printing device 200B actually acquires the ESS-ID at subsequent step Se05, cuts the connection with the personal computer 500 at step Se06, and concludes the functions as the relay station of the maker's wireless LAN at step Se07.

At step Se08, the printing device 200B utilizes the ESS-ID 'XX' acquired either at step Se05 or at step Se15 and establishes connection with the user's wireless LAN. The printing device 200B activates its communication establishment unit 158 to receive a radio beacon from the access point 100 and enter the user's wireless LAN.

As discussed above, the system of the third embodiment enables a device newly entering the wireless network to acquire the ESS-ID. The ESS-ID acquisition process is automatically executed according to the user's requirement. This desirably relieves the labor of the user for settings in additional devices to establish connection with the wireless network.

D. Other Embodiments:

The following describes a system attaining the flexible processing by utilizing a device that is capable of switching over connection with a first wireless network and a second wireless network, in a second embodiment of the present invention.

Figure 8:
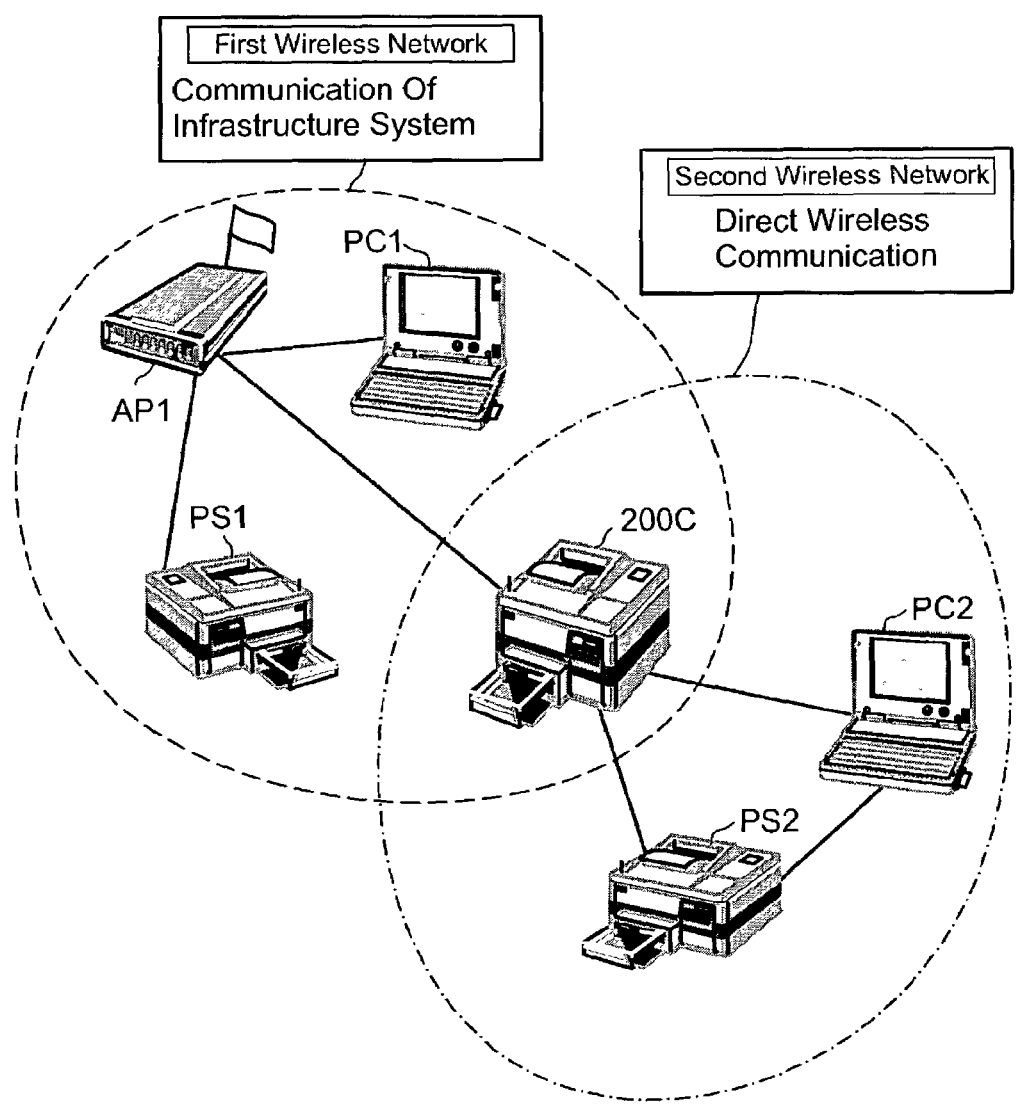
FIG. 8 schematically illustrates the configuration of a system in a fourth embodiment of the present invention.

FIG. 8 schematically illustrates the configuration of a system in the fourth embodiment. A printing device 200C in the fourth embodiment has the function of switching over connection with a first wireless network and a second wireless network. The printing device 200C also has the function of flexibly selecting and utilizing the suitable communication system to communicate with devices connecting with the two wireless networks. The example of FIG. 8 includes an access point AP1, personal computers PC1 and PC2, and printers PS1 and PS2 as objects of communication.

The first wireless network includes the access point AP1, the personal computer PC1, and the printer PS1. The printing device 200C functions as the terminal in the first wireless network and connects with the access point AP1 to establish communication with the personal computer PC1 and the printer PS1.

The second wireless network includes the personal computer PC2 and the printer PS2 and utilizes communication of the Ad Hoc system. The printing device 200C accordingly communicates with the personal computer PC2 and the printer PS2 by the Ad Hoc system.

The printing device 200C connecting with the first and the second wireless networks is used not only for the purpose of setting the ESS-ID as discussed in the above embodiments, but may be used for a diversity of objects. For example, the printing device 200C receives a printing request from the personal computer PC1 via the first wireless network and transmits the printing request to the printer PS2 via the second wireless network.

A variety of techniques are applicable to attain the two wireless networks. Each wireless network may be based on either of the Ad Hoc system and the infrastructure system. In the wireless network of the infrastructure system, the printing device may function as the relay station or another device may function as the relay station.

The above embodiments and their modifications are to be considered in all aspects as illustrative and not restrictive. There may be many modifications, changes, and alterations without departing from the scope or spirit of the main characteristics of the present invention. For example, any of the above processing may be actualized by hardware, instead of the software. The scope and spirit of the present invention are indicated by the appended claims, rather than by the foregoing description.

What is claimed is:

1. An adaptor for connection with a wireless network, said adaptor comprising:
  a first storage module that stores first setting information used for connection with a first wireless network;
  a second storage module that stores second setting information used for connection with a second wireless network that is set so that a device connectable to the first wireless network is configured to be connected to the second wireless network by default;
  a communication establishment module that carries out switchover between the first setting information and the second setting information at preset timings to establish direct connection with either of the first wireless network and the second wireless network; and
  a setting information transmission module that, when the communication establishment module switches to the second setting information for connection with the second wireless network, transmits the first setting information for connection with the first wireless network to another device connected to the second wireless network.

2. An adaptor in accordance with claim 1, wherein said setting information transmission module transmits the first setting information.

3. An adaptor in accordance with claim 1, wherein said communication establishment module functions as a relay station in the course of connection with the second wireless network.

4. An adaptor in accordance with claim 1, wherein said communication establishment module utilizes direct wireless communication in the course of connection with the second wireless network.

5. An adaptor in accordance with claim 1, wherein said second storage module stores plural sets of the second setting information, and said communication establishment module selects one set among the plural sets of the second setting information and establishes connection with the second wireless network.

6. An adaptor in accordance with claim 3, said adaptor further comprising:

a detector module that determines presence or absence of any device functioning as a relay station in the second wireless network, wherein said communication establishment module, in the case of the presence of the relay station, functions as a terminal relative to the relay station.

7. An adaptor in accordance with claim 6, wherein said setting information transmission module is not activated while said communication establishment module functions as the terminal.

8. An adaptor in accordance with claim 1, said adaptor further comprising:

a fetching control module that fetches the setting information via the wireless network when the stored setting information is an initial value, and otherwise sends a transmission requirement to a device connected via the wireless network.

9. An adaptor in accordance with claim 1, said adaptor being constructed as a network communication module for connecting a printing device with the wireless network.

10. A method of controlling an adaptor for connection with a wireless network, said method comprising the steps of:

(a) establishing direct connection with a first wireless network, based on first setting information used for connection with the first wireless network;

(b) establishing direct connection with a second wireless network, based on second setting information used for connection with the second wireless network that is set so that a device connectable to the first wireless network is configured to be connected to the second wireless network by default;

(c) carrying out switchover between said step (a) and said step (b) at preset timings; and (d) when the switchover to the second setting information occurs for connection with the second wireless network, transmitting the first setting information for connection with the first wireless network to another device connected to the second wireless network.

11. A computer readable recording medium in which a computer program that is used to connect an adaptor with a wireless network is recorded, said computer program causing said adaptor to attain the functions of:

(a) establishing direct connection with a first wireless network, based on first setting information used for connection with the first wireless network that is set so that a device connectable to the first wireless network is configured to be connected to the second wireless network by default;

(b) establishing direct connection with a second wireless network, based on second setting information used for connection with the second wireless network;

(c) carrying out switchover between said function (a) and said function (b) at preset timings; and (d) when the switchover to the second setting information occurs for connection with the second wireless network, transmitting the first setting information for connection with the first wireless network except to another device connected to the second wireless network.

12. The adaptor according to claim 1, wherein the adapter is inside the first and second wireless networks.

* * * * *